US012684343B2

(12) United States Patent
Bishop et al.

(10) Patent No.: US 12,684,343 B2
(45) Date of Patent: Jul. 14, 2026

(54) TRANSFERRING RESPONSIBILITY OF A PHYSICAL KEY FROM A TRANSFERER TO A TRANSFEREE

(71) Applicant: ASSA ABLOY Limited, Willenhall (GB)

(72) Inventors: John Bishop, Concord, NC (US); Monica Holman, Bedford (GB); Duncan Winner, Olney (GB)

(73) Assignee: ASSA ABLOY Limited, Willenhall (GB)

( * ) Notice: Subject to any disclaimer, the term of this patent is extended or adjusted under 35 U.S.C. 154(b) by 165 days.

(21) Appl. No.: 18/574,993

(22) PCT Filed: Jun. 27, 2022

(86) PCT No.: PCT/EP2022/067563
§ 371 (c)(1),
(2) Date: Dec. 28, 2023

(87) PCT Pub. No.: WO2023/274959
PCT Pub. Date: Jan. 5, 2023

(65) Prior Publication Data
US 2024/0323676 A1 Sep. 26, 2024

(30) Foreign Application Priority Data
Jun. 29, 2021 (SE) .................................... 2150832-0

(51) Int. Cl.
*H04W 12/033* (2021.01)
*G06F 3/0484* (2022.01)
(Continued)

(52) U.S. Cl.
CPC ........... *H04W 12/033* (2021.01); *H04W 4/80* (2018.02); *H04W 12/069* (2021.01)

(58) Field of Classification Search
CPC .... H04W 12/033; H04W 4/80; H04W 12/069
(Continued)

(56) References Cited

U.S. PATENT DOCUMENTS

| | | | |
|---|---|---|---|
| 10,721,224 B1 | 7/2020 | Sheffield et al. | |
| 2011/0088083 A1 | 4/2011 | Ficko et al. | |

(Continued)

FOREIGN PATENT DOCUMENTS

| | | | | | |
|---|---|---|---|---|---|
| WO | WO-2013076760 A1 | * | 5/2013 | ......... | G07C 9/00309 |
| WO | WO-2016049745 A1 | * | 4/2016 | ......... | G06Q 20/3821 |

(Continued)

OTHER PUBLICATIONS

"PCT EP 2022067563 ISR mailed Oct. 19, 2022", 6 pages.
(Continued)

*Primary Examiner* — Berhanu Shitayewoldetadik
(74) *Attorney, Agent, or Firm* — Schwegman Lundberg & Woessner, P.A.

(57) ABSTRACT

It is provided method of transferring responsibility of a physical key (3) from a transferer (5a) to a transferee (5b). The method is performed by a transferee device (2b), being a user device (2b) of the transferee (5b). The method comprises: establishing (40) a local communication channel (4) with a user device (2a) of the transferer (5a): receiving (42), over the local communication channel (4), a request to register that the responsibility of the physical key (3) is transferred from the transferer (5a) to the transferee (5b): receiving (44) user input indicating that the responsibility of the physical key (3) is accepted by the transferee (5b); and transmitting (46) a confirmation of registration of transferring the responsibility of the physical key (3) to the transferee (5b).

13 Claims, 2 Drawing Sheets

(51) Int. Cl.

| | |
|---|---|
| *G06F 3/16* | (2006.01) |
| *G06F 21/31* | (2013.01) |
| *G06F 21/60* | (2013.01) |
| *H04W 4/80* | (2018.01) |
| *H04W 12/069* | (2021.01) |
| *H04W 76/02* | (2009.01) |

(58) Field of Classification Search

USPC .......................................................... 713/155

See application file for complete search history.

(56) References Cited

U.S. PATENT DOCUMENTS

| | | | | |
|---|---|---|---|---|
| 2011/0159857 | A1* | 6/2011 | Faith ................... | H04L 63/0861 |
| | | | | 455/414.3 |
| 2011/0161659 | A1* | 6/2011 | Himawan ............. | H04L 9/3263 |
| | | | | 713/156 |
| 2016/0192192 | A1* | 6/2016 | Seedorf ................ | H04L 9/3265 |
| | | | | 713/176 |
| 2017/0104735 | A1 | 4/2017 | Brown et al. | |
| 2018/0032759 | A1* | 2/2018 | Radocchia .......... | G06F 21/6254 |
| 2019/0222418 | A1 | 7/2019 | O'brien et al. | |
| 2019/0259495 | A1 | 8/2019 | Fridman | |
| 2019/0318442 | A1 | 10/2019 | Lutnick et al. | |
| 2020/0186363 | A1* | 6/2020 | Shockley .............. | H04L 9/0825 |
| 2020/0186506 | A1* | 6/2020 | Shockley ................. | H04L 9/14 |
| 2020/0351089 | A1* | 11/2020 | Wentz ................... | H04L 9/3236 |
| 2021/0182773 | A1* | 6/2021 | Padmanabhan ....... | H04L 9/3239 |
| 2021/0243179 | A1* | 8/2021 | Sheffield ............. | H04W 12/084 |

FOREIGN PATENT DOCUMENTS

| | | |
|---|---|---|
| WO | 2019168783 | 9/2019 |
| WO | 2020164675 | 8/2020 |
| WO | 2023274959 | 1/2023 |

OTHER PUBLICATIONS

"PCT EP 2022067563 Written Opinion mailed Oct. 19, 2022", 7 pages.

"PCT EP 2022067563 2nd Written Opinion mailed May 11, 2023", 4 pages.

"PCT EP 2022067563 IPRP mailed Sep. 6, 2023", 15 pages.

"210424SE_SE Office Action and SE search report mailed Mar. 1, 2022", 9 pages.

* cited by examiner

Start

<u>40</u>
Establish local communication

<u>42</u>
Receive request

<u>43</u>
Verify valid transferee

<u>44</u>
Receive user input

<u>45</u>
Authenticate

<u>46</u>
Transmit confirmation

End

<u>2b</u>

<u>60</u>
Processor

<u>62</u>
I/O

<u>64</u>

<u>67</u>

<u>66</u>

90

91

TRANSFERRING RESPONSIBILITY OF A PHYSICAL KEY FROM A TRANSFERER TO A TRANSFEREE

CROSS-REFERENCE TO RELATED APPLICATION(S)

This application is a national stage application under 35 U.S.C. § 371 of PCT Appl. No. PCT/EP2022/067563, titled "Transferring Responsibility of a Physical Key from a Transferer to a Transferee," filed Jun. 27, 2022, which claims priority to Swedish Patent Appl. No. 2150832-0, filed Jun. 29, 2021, each of which is incorporated herein by reference in its entirety.

TECHNICAL FIELD

The present disclosure relates to the field of transferring responsibility of a physical key from a transferer to a transferee.

BACKGROUND

Traditionally, for automated key cabinets keeping track of physical keys, a transfer of a physical key from a transferer to a transferee is performed by the transferer depositing the key in the automated key cabinet and the transferee subsequently retrieving the key from the automated key cabinet.

A direct transfer process, where the physical key is handed from a transferer to a transferee improves the procedure. This transfer of responsibility is updated in the automated key cabinet and/or in other systems to keep track of who has the responsibility of the key.

The authentication for the transfer of the key can be inconvenient in terms of the user interface actions of the transferer and the transferee.

SUMMARY

One object is to improve convenience for transfer of responsibility of a physical key from a transferer to a transferee.

According to a first aspect, it is provided a method of transferring responsibility of a physical key from a transferer to a transferee, the method being performed by a transferee device, being a user device of the transferee. The method comprises: establishing a local communication channel with a user device of the transferer; receiving, over the local communication channel, a request to register that the responsibility of the physical key is transferred from the transferer to the transferee; receiving user input indicating that the responsibility of the physical key is accepted by the transferee; and transmitting a confirmation of registration of transferring the responsibility of the physical key to the transferee.

The receiving user input may comprise receiving accelerometer data, from the transferee device, indicating a bump against an object and correlating the accelerometer data with corresponding accelerometer data from the user device of the transferer.

The local communication channel is based on at least one of Bluetooth, Bluetooth Low Energy, Near-Field Communication and ZigBee.

The method may further comprise: verifying that the transferee is a valid receiver of the physical key.

The verifying may comprise verifying against locally stored data that is cryptographically signed.

The transferee may be a valid receiver when the transferee is licensed to drive a vehicle associated with the physical key.

The transferee may be a valid receiver when the transferee belongs to an organisation associated with an asset secured by the physical key.

The method may further comprise: authenticating the transferee.

According to a second aspect, it is provided a transferee device being a user device of a transferee when transferring responsibility of a physical key from a transferer to the transferee. The transferee device comprises: a processor; and a memory storing instructions that, when executed by the processor, cause the transferee device to: establish a local communication channel with a user device of the transferer; receive, over the local communication channel, a request to register that the responsibility of the physical key is transferred from the transferer to the transferee; receive user input indicating that the responsibility of the physical key is accepted by the transferee; and transmit a confirmation of registration of transferring the responsibility of the physical key to the transferee.

The instructions to receive user input comprise instructions that, when executed by the processor, cause the transferee device to receive accelerometer data, from the transferee device, indicating a bump against an object and correlate the accelerometer data with corresponding accelerometer data from the user device of the transferer.

The local communication channel is based on at least one of Bluetooth, Bluetooth Low Energy, Near-Field Communication and ZigBee.

The transferee device may further comprise instructions that, when executed by the processor, cause the transferee device to: verify that the transferee is a valid receiver of the physical key.

The instructions to verify may comprise instructions that, when executed by the processor, cause the transferee device to verify against locally stored data that is cryptographically signed.

The transferee may be a valid receiver when the transferee is licensed to drive a vehicle associated with the physical key.

The transferee may be a valid receiver when the transferee belongs to an organisation associated with an asset secured by the physical key.

The transferee device may further comprise instructions that, when executed by the processor, cause the transferee device to: authenticate the transferee.

According to a third aspect, it is provided a computer program for transferring responsibility of a physical key from a transferer to a transferee. The computer program comprising computer program code which, when executed on a transferee device being a the user device of the transferee causes the user device of the transferee to: establish a local communication channel with a user device of the transferer; receive, over the local communication channel, a request to register that the responsibility of the physical key is transferred from the transferer to the transferee; receive user input indicating that the responsibility of the physical key is accepted by the transferee; and transmit a confirmation of registration of transferring the responsibility of the physical key to the transferee.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
FIG. 1 is a schematic diagram illustrating an environment in which embodiments presented herein can be applied.
Figure 1:
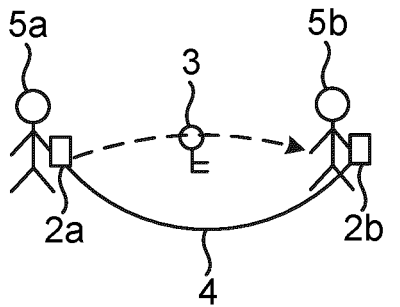
Figure 1:
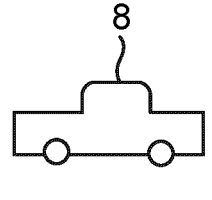

FIG. 1 is a schematic diagram illustrating an environment in which embodiments presented herein can be applied.

A physical key 3 is used for gaining access to an asset 8, such as a vehicle. On occasion, access to the asset 8 needs to be transferred from one person, here denoted a transferer 5a, to another person, here denoted a transferee 5b, e.g. for access to a vehicle. The person being responsible for the physical key 3 can be tracked in a system 6, such as an automated key cabinet.

The transferer 5a has a user device, here denoted a transferer device 2a and the transferee 5b has a user device, here denoted a transferee device 2b. While using different terms, the transferer device 2a and the transferee device 2b can be of the same type, even identical device performing different parts of the same software. It is also possible that the devices 2a-b are of different types.

Each one of the transferer device 2a and the transferee device 2b can e.g. be a smartphone, a wearable device (e.g. smartwatch or smart ring) or a tablet computer. The transferer device 2a and the transferee device 2b can communicate over local communication, i.e. point-to-point communication. The local communication 4 can be based on any one or more of Bluetooth, Bluetooth Low Energy (BLE), Near-Field Communication and ZigBee, etc.

The functions disclosed herein performed by the transferer device 2a and the transferee device 2b can be performed by applications (also known as apps) respectively executing in the transferer device 2a and the transferee device 2b.

When registering a transfer of the physical key 3, the local communication 4 is used between the transferer device 2a and the transferee device 2b as a handshake between the apps of the transferer device and the transferee device.

Optionally, a suitable transferrer 5a is determined prior to performing the actual transfer of the key. For example, a transferee 5a desires a certain type of vehicle and when no keys are stored within an automated key cabinet for the desired type of vehicle, a push notification is transmitted to the user device 2a of all potential transferers 5a, being key holders of that type of vehicle. This process can include a quick survey of which key holders (potential transferers 5a) via their respective devices 2a, are happy to transfer the key (a time dependent yes/no push notification prompt) and then collates the survey result (in real time) and provides the transferee with a real-time visual means of picking which transferer. The survey is then suspended, the transfer occurs and, when successful, the survey ends. Where multiple potential transferers 5a are identified, locality of those users could be considered, particularly if other users are some distance away e.g. at offsite storage.

Figure 2:
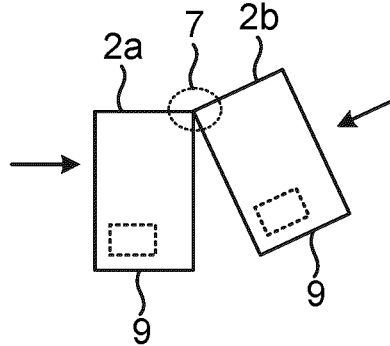
FIG. 2 is a schematic diagram illustrating a bump between the transferer device 2a and the transferee device 2b.

FIG. 2 is a schematic diagram illustrating a bump between the transferer device 2a and the transferee device 2b.

The bump 7 occurs by tapping the transferer device 2a and the transferee device 2b against each other. Accelerometers 9 in the two devices 2a-b detect the bump. The bump is used to confirm the transfer of the physical key from the transferer device 2a to the transferee device 2b, resulting in a registration of a transfer of responsibility of the physical key from the transferer 5a to the transferee 5b.

Figure 3:
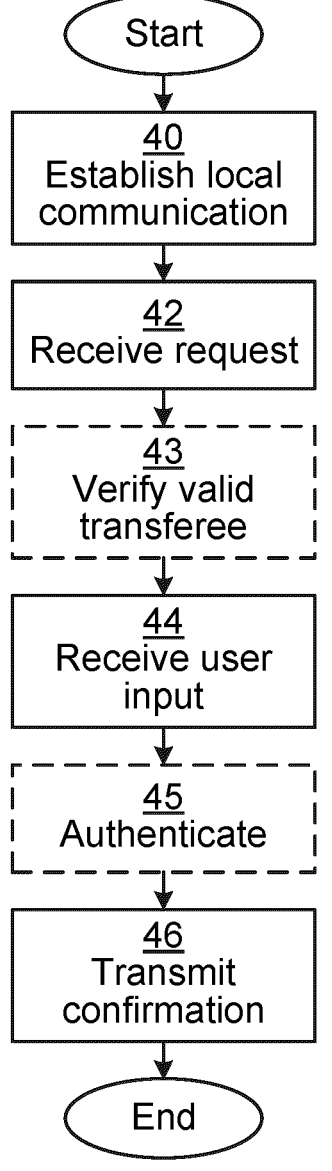
FIG. 3 is a flow chart illustrating embodiments of methods for transferring responsibility of a physical key from a transferer to a transferee.

FIG. 3 is a flow chart illustrating embodiments of methods for transferring responsibility of a physical key from a transferer to a transferee. The method is performed in the transferee device 2b. Prior to this method starting, the transferer 5a and/or the transferee 5b have indicated (using the transferer device 2a and/or the transferee device 2b) the identity of the physical key 3 that is transferred.

In an establish local communication channel step 40, the transferee device 2b establishes a local communication channel 4 with a user device of the transferer 5a (i.e. with the transferer device 2a). The local communication channel 4 can be based on at least one of Bluetooth, Bluetooth Low Energy, Near-Field Communication and ZigBee. The local communication channel 4 can be considered to be a peer-to-peer communication channel.

In a receive request step 42, the transferee device 2b receives, over the local communication channel 4, a request to register that the responsibility of the physical key 3 is transferred from the transferer 5a to the transferee 5b. The request can be received from the transferer device 2a.

In an optional verify valid transferee step 43, the transferee device 2b verifies that the transferee 5b is a valid receiver of the physical key 3. For instance, when the asset for which access is given by the physical key is a vehicle, this step can comprise verifying (against data or a database, e.g. in the automated key cabinet 6 or elsewhere) that the transferee 5a has a valid driver's license with appropriate certification to drive the vehicle. In other words, the transferee is then a valid receiver when the data indicates that the transferee is licensed to drive a vehicle associated with the physical key. Alternatively or additionally, the transferee is a valid receiver when the data indicates that transferee belongs to an organisation associated with an asset secured by the physical key. Alternatively or additionally, the transferee is a valid receiver when the data indicates that the transferee is authorised to take responsibility of assets up to a certain value, that is greater than the value of the asset associated with the physical key. In one embodiment, the verifying comprises verifying against locally stored data that is cryptographically signed by a a trusted third party. The signed data that indicates that the transferee is a valid receiver of the physical key can be communicated to the transferor device, allowing the transferor to also verify the authority if the transferee to take over responsibility of the physical key. All of this can occur using only local communication. While this verification does not stop the transferer 5a from handing over the physical key 3 to the transferee 5b, any failed verification is noted and the transferer 5a and central functions can be informed of the invalid transfer.

In a receive user input step 44, the transferee device 2b receives user input indicating that the responsibility of the physical key 3 is accepted by the transferee 5b.

This receiving of user input can comprise receiving accelerometer data, from the transferee device 2b, indicating a bump 10 against an object. In this case, this also includes correlating the accelerometer data with corresponding accelerometer data from the user device 2a of the transferer, to verify that the bump occurred between the two devices and that the bump is not against any other object. In other words, in this embodiment, the transferer 5a and the transferee 5b simply bump their devices 2a, 2b against each other to confirm the transfer of responsibility. This is verified by the transferee device 2b (and optionally the transferer device) by the bumps (indicated by respective accelerometers) correspond to each other in time.

Alternatively, the user input is a user input of a touchscreen of the transferee device 2b.

In an optional authenticate step 45, the transferee device 2b authenticates the transferee. This can occur using any suitable authentication method of the transferee device 2b, e.g. passcode, face recognition, fingerprint recognition, etc. The authentication provides an indication that it is indeed the transferee 5b that accepts responsibility of the physical key.

In a transmit confirmation step 46, the transferee device 2b transmits a confirmation of registration of transferring the responsibility of the physical key 3 to the transferee 5b. The confirmation can be transmitted to the transferer device 2a and/or a central component such as the automated key cabinet 6. In this way, the automated key cabinet 6 can keep track of who is responsible for the physical key 3 even when there is a direct transfer from the transferer 5a to the transferee 5b without depositing the physical key 3 in the automated key cabinet 6. Optionally, if the transferee device 2b does not have network access at the time of transfer of the physical key, the confirmation can be stored in a queue in the transferee device 2b and is transmitted when network connectivity returns. This enables direct transfer of the portable key to occur even in environments with poor network reception, e.g. in underground garages, etc.

Optionally, a slightly different process of registering transfer of the physical key can be provided. This optional process is suited for certain scenarios, for example where an employee of a car repair workshop is handing the customer the key after delivering their vehicle to their home (and therefore nominating the last transferee of the key to be the customer rather than the employee who delivered) or where the employee is handing the key to a third party body shop or car transport.

In this optional process, although the key is being transferred from transferer to transferee, the exchange is based on a greater level of verification and the transferee's device does not need to be part of the same ecosystem.

In this scenario, a Time-based One-time Password (TOTP) can be used (displayed or presented via a QR (quick response) Code or transmitted via local communication such as Bluetooth/NFC (Near-Field Communication)), such that the transferee device 2b (of the customer in this scenario) displays or provides the code and the transferer device 2a inputs the code. The code input can be based on any of manual entry, QR code reading (via a camera) or Bluetooth/NFC communication with the transferee device. This procedure provides a greater level of trust over the transaction.

This would also enable the untrusted third party without requiring the same app/device, and instead the TOTP code could be generated by another trusted app with integration or issued to the third party (and not the transferer) as part of an automated system (for example as part of an electronic work order to collect the car or digital paperwork a customer receives).

The TOTP may have extended duration e.g. 24 hours, and, in one embodiment, the TOTP is known to the (electronic) transferer device 2a without being visible to the user transferer 5a (human) in order to facilitate verification of transferee 5b and device 2b in an environment with poor network reception.

Using embodiments presented herein, a convenient yet secure way of performing a direct transfer of a physical key 3 from the transferer 5a to the transferee 5b is achieved. By using the local communication, there is no requirement to have network access at the time of (registering) the transfer. Moreover, latency is reduced compared to communicating via a central node.

Figure 4:
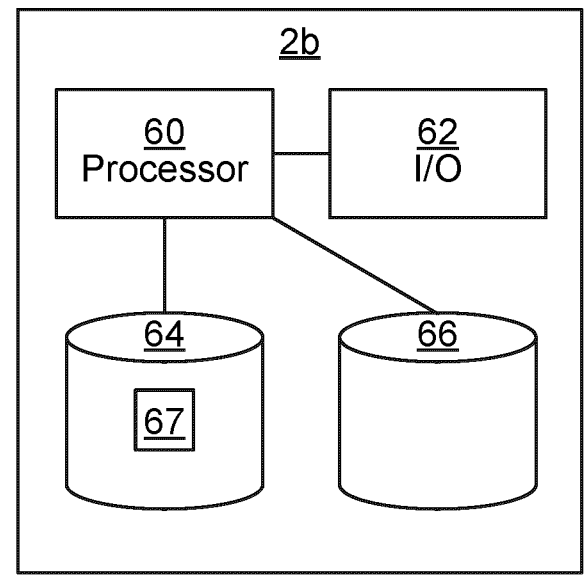
FIG. 4 is a schematic diagram illustrating components of the transferee device of FIG. 1.

FIG. 4 is a schematic diagram illustrating components of the transferee device 2b of FIG. 1. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The transferee device 2b further comprises an I/O interface 62 for communicating with external and/or internal entities. The I/O interface 62 also includes a user interface.

Other components of the transferee device 2b are omitted in order not to obscure the concepts presented herein.

Figure 5:
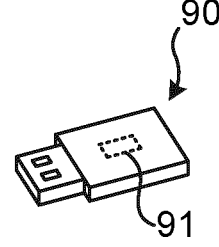
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 4. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of transferring responsibility of a physical key to reflect a transfer of the physical key from a transferer to a transferee, the method being performed by a transferee device, being a user device of the transferee, the method comprising:

establishing a local communication channel with a user device of the transferer;

receiving, over the local communication channel, a request to register that the responsibility of the physical key is transferred from the transferer to the transferee;

verifying that the transferee is a valid receiver of the physical key, which comprises verifying against locally stored data that is cryptographically signed by a trusted third party;

receiving user input indicating that the responsibility of the physical key is accepted by the transferee; and transmitting a confirmation of registration of transferring the responsibility of the physical key to the transferee to reflect the transfer of the physical key from the transferer to the transferee.

2. The method according to claim 1, wherein receiving user input comprises receiving accelerometer data, from the transferee device, indicating a bump against an object and correlating the accelerometer data with corresponding accelerometer data from the user device of the transferer.

3. The method according to claim 1, wherein the local communication channel is based on at least one of Bluetooth, Bluetooth Low Energy, Near-Field Communication, or ZigBee.

4. The method according to claim 1, wherein the transferee is a valid receiver when the transferee is licensed to drive a vehicle associated with the physical key.

5. The method according to claim 1, wherein the transferee is a valid receiver when the transferee belongs to an organisation associated with an asset secured by the physical key.

6. The method according to claim 1, further comprising: authenticating the transferee.

7. A transferee device being a user device of a transferee when transferring responsibility of a physical key to reflect a transfer of the physical key from a transferer to the transferee, the transferee device comprising:

a processor; and a memory storing instructions that, when executed by the processor, cause the transferee device to:

establish a local communication channel with a user device of the transferer;

receive, over the local communication channel, a request to register that the responsibility of the physical key is transferred from the transferer to the transferee;

verify that the transferee is a valid receiver of the physical key, which comprises verifying against locally stored data that is cryptographically signed by a trusted third party;

receive user input indicating that the responsibility of the physical key is accepted by the transferee; and transmit a confirmation of registration of transferring the responsibility of the physical key to the transferee to reflect the transfer of the physical key from the transferer to the transferee.

8. The transferee device according to claim 7, wherein the instructions to receive user input comprise instructions that, when executed by the processor, cause the transferee device to receive accelerometer data, from the transferee device, indicating a bump against an object and correlate the accelerometer data with corresponding accelerometer data from the user device of the transferer.

9. The transferee device according to claim 8, wherein the local communication channel is based on at least one of Bluetooth, Bluetooth Low Energy, Near-Field Communication, or ZigBee.

10. The transferee device according to claim 7, wherein the transferee is a valid receiver when the transferee is licensed to drive a vehicle associated with the physical key.

11. The transferee device according to claim 7, wherein the transferee is a valid receiver when the transferee belongs to an organisation associated with an asset secured by the physical key.

12. The transferee device according to claim 7, further comprising instructions that, when executed by the processor, cause the transferee device to: authenticate the transferee.

13. A non-transitory computer readable medium storing a computer program for transferring responsibility of a physical key to reflect a transfer of the physical key from a transferer to a transferee, the computer program comprising computer program code which, when executed on a transferee device being a user device of the transferee, causes the user device of the transferee to:

establish a local communication channel with a user device of the transferer;

receive, over the local communication channel, a request to register that the responsibility of the physical key is transferred from the transferer to the transferee;

verify that the transferee is a valid receiver of the physical key, which comprises verifying against locally stored data that is cryptographically signed by a trusted third party;

receive user input indicating that the responsibility of the physical key is accepted by the transferee; and transmit a confirmation of registration of transferring the responsibility of the physical key to the transferee to reflect the transfer of the physical key from the transferer to the transferee.

* * * * *